United States Patent [19]

Coughlin et al.

[11] 4,426,566

[45] Jan. 17, 1984

[54] APPARATUS FOR COLLECTING PROCESS GENERATED FUME AND/OR SLAG

[75] Inventors: William J. Coughlin, Lancaster; Perry J. Rieppel, Worthington; Stephen A. Hoffman, Lancaster, all of Ohio

[73] Assignee: Arcair Company, Lancaster, Ohio

[21] Appl. No.: 269,183

[22] Filed: Jun. 1, 1981

Related U.S. Application Data

[63] Continuation-in-part of Ser. No. 25,320, Mar. 30, 1979, abandoned.

[51] Int. Cl.[3] .................................... B23K 9/32

[52] U.S. Cl. .................... 219/137.41; 219/136; 219/70

[58] Field of Search .................. 219/137.41, 74, 70, 219/136; 15/339, 353

[56] References Cited

U.S. PATENT DOCUMENTS

| | | | |
|---|---|---|---|
| 1,711,151 | 4/1929 | Lincoln | 219/74 |
| 2,336,283 | 12/1943 | Neill | 219/137.41 |
| 2,916,761 | 12/1959 | Oberg | 15/340 X |
| 4,062,085 | 12/1977 | Duncan | 15/339 |

FOREIGN PATENT DOCUMENTS

| | | | |
|---|---|---|---|
| 197708 | 8/1977 | U.S.S.R. | 219/137.41 |

OTHER PUBLICATIONS

Hobart "Smoke Exhaust News", 11/76, 4 pages, Hobart Bros Troy Ohio.

Nyuzu "Automatic Gouging Silencer/Dust Collector Apparatus" #198, pp. 3-5, 1/78.

*Primary Examiner*—B. A. Reynolds
*Assistant Examiner*—Catherine M. Sigda
*Attorney, Agent, or Firm*—James C. Simmons; E. Eugene Innis

[57] ABSTRACT

Method and system for collecting fume and/or waste particulate matter generated in a process used to surface treat, cut, gouge or join a workpiece by means of elevated temperature (e.g. electric arc).

The system includes means to collect and quench the effluent (slag and/or fume) in a cooled nozzle coupled with means to separate solid particles and cooling fluid, in the case of a working environment including air and return cleansed air to the ambient environment.

9 Claims, 5 Drawing Figures

FIG. 3
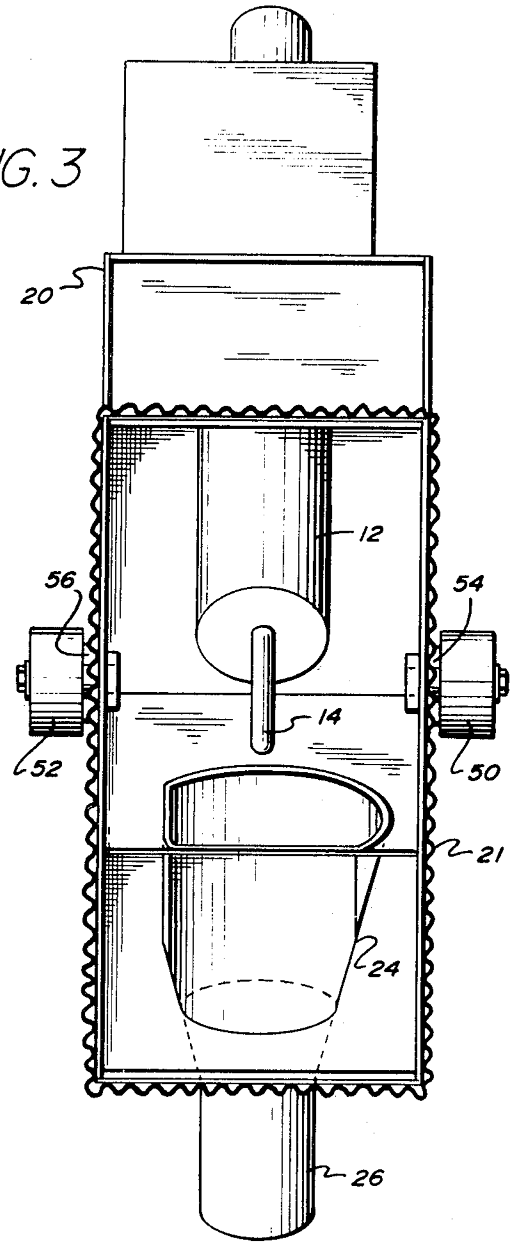
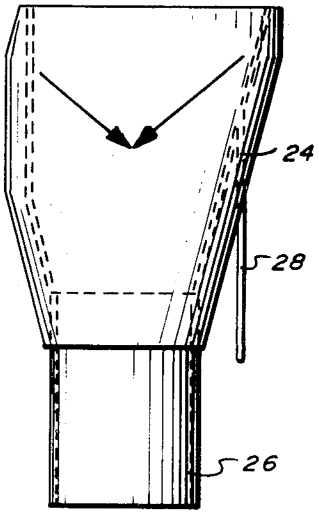
FIG. 4

APPARATUS FOR COLLECTING PROCESS GENERATED FUME AND/OR SLAG

This Application is a continuation-in-part of U.S. Patent Application Ser. No. 25,320, filed Mar. 30, 1979 now abandoned.

TECHNICAL FIELD

This invention pertains to the field of collecting process generated fume and/or waste particulate matter (e.g. slag) generated by a process used to surface treat, cut, gouge or join a workpiece by means of elevated temperature (e.g. electric arc).

In particular the Air-Carbon Arc Cutting and Gouging Process is used to prepare metals for subsequent finishing operations such as welding. In the Air-Carbon Arc Cutting and Gouging Process an electric arc is struck between an electrode and a workpiece to initiate melting of the workpiece under the arc. The molten metal produced by the arc is forcibly removed from the workpiece by a stream of high pressure air. The Air-Carbon Arc Cutting and Gouging Process generates a large amount of fume because of the thermochemical reactions and produces waste particulate material in the form of a metal containing slag. With the advent of tighter air pollution control restrictions ways have been sought to prevent the process generated fume and/or slag from being forced into the ambient environment and in particular the environment within which the user of the process has to function.

BACKGROUND OF THE PRIOR ART

Fume collectors have been known for some time and are widely available for use with conventional welding torches. These devices are associated with a welding torch wherein as the welding proceeds, dense volumes of fume are produced which are forcibly removed by creating a partial vacuum in a sleeve disposed near the nozzle of the torch. The fume is sucked away from the torch head through a conduit and disposed of in a safe manner as is well known in the air handling art.

Insofar as the Air-Carbon Arc Cutting and Gouging Process is concerned and any other process that would generate fume and/or slag U.S. Pat. No. 3,524,038 discloses a device for removing solid particulate matter from the vicinity of the arc. The device of the '038 patent has been available for some time as a hand held tool or a machine mounted tool that must be used in close proximity to an air-carbon arc cutting and gouging torch. While the device of the '038 patent will remove some process generated fume, it will not provide the type of atmosphere movement to comply with current air pollution requirements. Furthermore, a device of this type will become quickly clogged by process generated slag since the slag will adhere to the mouth as well as the walls of the nozzle.

The literature shows that in Japan installations employing the Air-Carbon Arc Cutting and Gouging Process have utilized conventional cutting tables with a water bath to collect slag generated by the process. The Japanese have further combined the conventional water table with an acoustically lined hood to contain fume and to control the noise level of the process in the immediate environment of the process user. The heavy slag particles are free falling into a receptacle in the lower part of the apparatus which contains the water. Slag handled in this manner will stick together, or fuse into a solid mass and also will adhere to the side walls of the receptacle, thus necessitating mechanical removal of the slag from the walls. This type of apparatus is not readily portable and requires a fixed installation where the workpiece must be transported to the installation to be treated.

SUMMARY OF THE INVENTION

In order to provide an improved method and apparatus for maintaining the ambient envirnoment around a process apparatus which generates fume and/or molten waste particulate material it was discovered that isolating the area immediately surrounding the process apparatus enables the environment in the isolated area (fume, air or other gas, and particulate matter) to be subjected to processes whereby the particulate matter is removed, the pollutents separated from the environmental gas (e.g. air) the environmental gas recycled. The invention is achieved through the use of a system arrangement whereby a housing containing means to isolate the environment can be disposed adjacent to the workpiece and moved along with the treating apparatus. The housing is adapted to position the treating apparatus at the proper angle to the workpiece and also to support a collection nozzle adapted to receive a cooling fluid mixed with air. The fluid cooled collection nozzle is evacuated continuously thus drawing process generated fume, the isolated environment, and the particulate matter through the nozzle and propelling it to a filtering system where the water, isolated environment, fume, and particulate matter can be separated for reuse without polluting the environment.

Therefore, it is the primary object of the present invention to provide an improved method for maintaining a clean environment in the vicinity of a treatment process which generates fume and/or particulate matter.

It is another object of the present invention to provide a method for disposing of process generated fume and/or molten slag associated with the air-carbon arc cutting and gouging process.

It is still another object of the present invention to provide an apparatus suitable for use with the air-carbon arc cutting and gouging process to remove process generated fume and/or molten slag from the environment of the apparatus and the user of the apparatus.

It is yet another object of the present invention to provide pollution control apparatus for use with process equipment which generates fume and/or molten slag as part of its operation.

BRIEF DESCRIPTION OF THE DRAWING

FIG. 3 is a bottom plan view of the apparatus of FIG. 2.

FIG. 4 is an elevational view of the nozzle according to the present invention.

DETAILED DESCRIPTION OF THE PREFERRED EMBODIMENT

Figure 1:
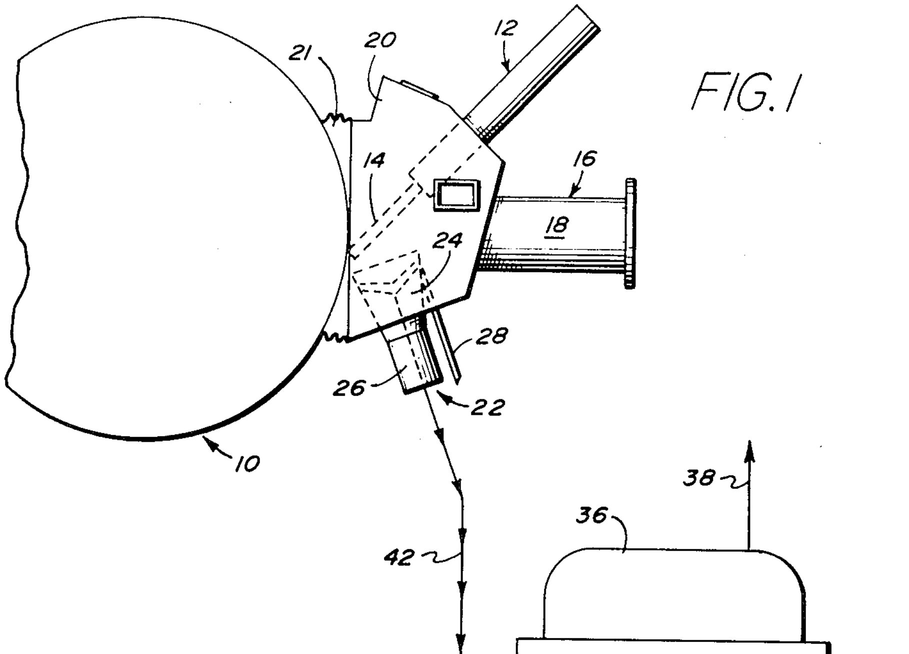
FIG. 1 is a schematic diagram illustrating the method and one system employing the method according to the present invention.
Figure 1:
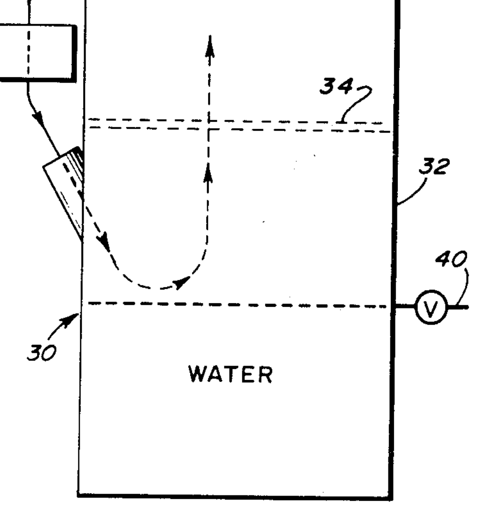

The present invention will be described in relation to the Air-Carbon Cutting and Gouging Process as it was first disclosed in U.S. Pat. No. 2,706,236. This patent discloses the method which resides in providing an electrode so that an electric arc can be struck between the electrode and a workpiece to cause portions of the workpiece to melt under the influence of the electric arc. Simultaneously, as the arc causes the metal to melt a stream of high pressure air is forced along the electrode to forcibly remove the molten metal from under the influence of the arc. In this manner the process can be utilized to remove surface defects or sever complete portions of a workpiece.

An improved hand operated air-carbon arc cutting and gouging torch is disclosed in U.S. Pat. No. 3,573,419. The Air-Carbon Arc Cutting and Gouging Process has been automated and one type automatic torch is disclosed in U.S. Pat. No. 3,317,779. U.S. Pat. No. 3,659,071 discloses an improvement of the automatic torch of the '779 patent. The Air-Carbon Arc Cutting and Gouging Process generates from 30 to 250 pounds per hour of molten metallic and oxide slag and various solid and gaseous fumes. At least 95% by weight of this effluent is molten metallic and oxide slag in the form of particles or globs up to about ¼ inch in diameter. The quantity of effluent from this process is many times greater than for any conventional arc welding process. Furthermore, the air blast that removes the molten metal and slag from the workpiece under the influence of the arc has a velocity of from 150 to 250 feet per second and accelerates the effluent including the slag particles to high speeds. As molten particles travel through the air, their surface burns producing fine oxide smoke or fumes. This burning tends to keep the particles hot as they travel a considerable distance from the point of origin under the arc.

Molten slag particles traveling at high speed striking an object made of any material such as metals, ceramic, plastics, glass and the like will adhere to the surface they strike. After a first layer of particles adhers to a given surface, additional molten particles will adhere to the previous layer of slag particles and rapidly build up into a semi-molten or solid mass. Because of this phenomenon collection devices made of known materials become quickly coated with slag and also very quickly become clogged with a mass of slag. The agglomeration and adherence of slag particles has prevented development of a useable continuously operating collection and conveying device for the Air-Carbon Arc Cutting and Gouging Process. Furthermore, molten particles traveling at short range from the arc may collide and merge with other particles forming a larger particle which because of the increased mass will decelerate and drop to the work surface of other location before smaller particles which will travel a further distance.

The quantity and properties of the Air-Carbon Arc Cutting and Gouging Process effluent have presented very difficult problems in developing an apparatus for collection, separation and disposal of the solid and gaseous fractions generated. The nature of the process permits its use in any space on a workpiece that is large enough to allow normal electric arc welding. For this reason space immediately around the location of its use is frequently small thus adding to the problems of developing adequate collection devices especially for the hot metallic slag which can be damaging to many objects it may impinge upon.

Referring now to the drawing, FIG. 1, discloses a workpiece 10 shown to be a cylinder. The workpiece can be any convenient shape and can be mounted for rotation about an axis as in the case of a cylindrical bar, tube, extrusion or the like. Assuming the workpiece has significant surface defects and that a portion of the surface is to be removed by the Air-Carbon Arc Cutting and Gouging Process the workpiece can be rotated and the air-carbon arc gouging apparatus shown schematically as 12 can be positioned so that electrode 14 can be utilized to strike an arc with the workpiece 10. High pressure air can be forced longitudinally along the electrode by means of a remote source of air (not shown). The process then can continue until the surface of the workpiece 10 is cleaned and free of defects. As set out above during the operation of the Air-Carbon Arc Cutting and Gouging Process molten metal is produced which is forcibly removed from the arc. In the case of the apparatus shown schemetically in FIG. 1, assuming the workpiece is rotating counterclockwise the molten metal would be forced toward the bottom of the Figure and copious amounts of fume would be generated which would flood the immediate area of the torch 12 and the surrounding ambient environment, thus exposing an operator to the fume and particulate matter generated by the process.

In order to eliminate this hazard a housing shown generally as 16 containing a mounting arm 18 and a collecting hood 20 is positioned adjacent the workpiece 10 opposite to the process apparatus or tool (torch) 12. Mounting arm 18 is utilized to fix housing 16 to the torch support (not shown) or other fixed support so that hood 20 can be properly positioned vis-a-vis the workpiece 10. Hood 20 includes means for holding the process apparatus 12 (e.g. air-carbon arc cutting and gouging torch) in the proper position to achieve its intended result vis-a-vis the workpiece 10. Disposed opposite to the torch 12 and also held by hood 20 is a slag and fume collection apparatus 22. Hood 20 is preferably lined with an acoustical absorbing material to reduce process noise in the surrounding area. Hood 20 includes viewing ports 23 so that the process can be observed. The apparatus 22 includes a nozzle assembly 24 as will hereinafter be more fully described and a collection tube 26. Associated with the nozzle assembly 24 is a conduit 28 for admitting cooling fluid and air to the nozzle assembly 24. Collection tube 26 is connected by a conduit to an air pump 29 and through further conduit to a filtering system 30. The filtering system includes a reservoir 32 adapted to receive a quantity of cooling fluid. In the upper part of fliter system 30 there is included a particulate filter 34 between the reservoir 32 and an air mover 36. Air mover 36 is adapted to evacuate filtering system 30 and dispose of a cleaned gas as shown by arrow 38. The cleaned gas 38, in the case of air, can be put back into the ambient environment. In the case of a gas such as an inert gas used to surround the process apparatus this gas can be returned for reuse in association with the process. Reservoir 32 includes a suitable drain and valve arrangement 40 to remove fluid from reservoir 32. Withdrawal flow in this system is shown by the continuous arrow 42 which continues on through the filter system.

The hood 20 can include a flexible curtain 21 fixed to the lower periphery of a hood 20 to provide a flexible seal between the workpiece and the hood 20 to minimize escape of the atmosphere surrounding the process apparatus or tool (e.g. torch 12).

Figure 2:
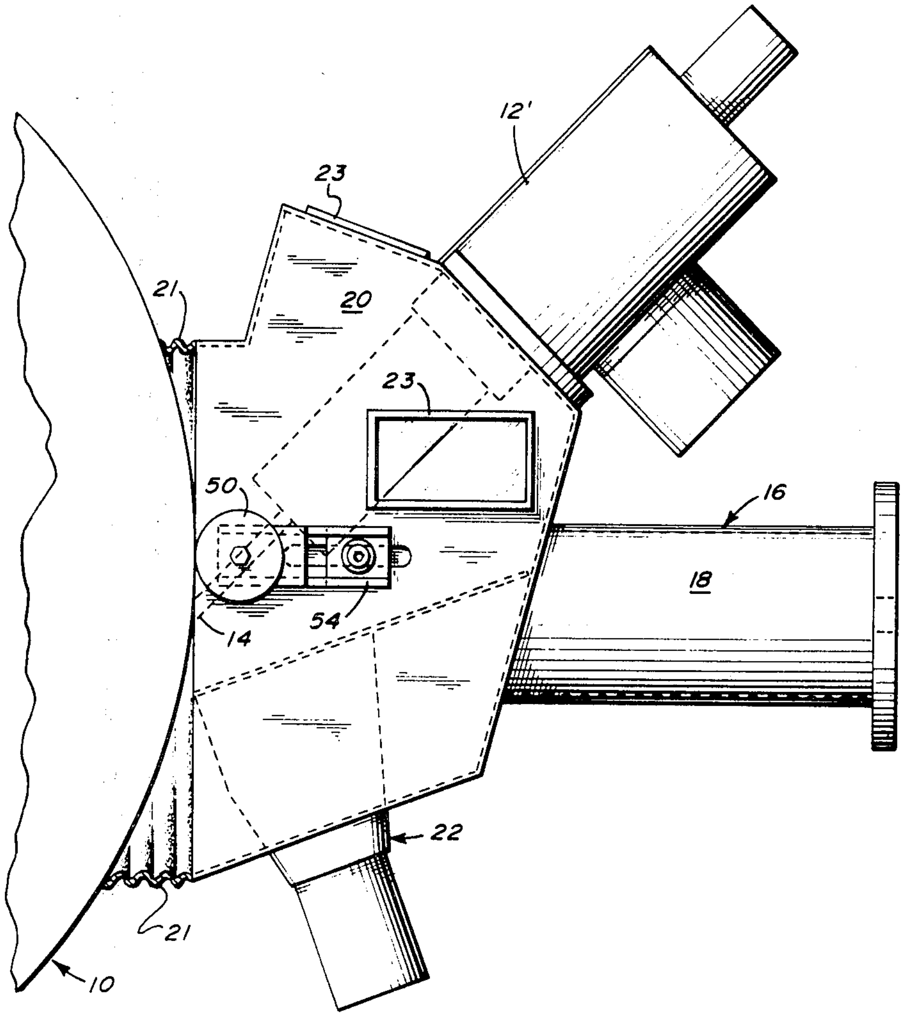
FIG. 2 is a front elevational view of an apparatus according to the present invention.

In operation the workpiece 10 is subjected to the process apparatus and as the fume and molten particulate matter are generated they are forced by a combination of the process air (in the case of the Air-Carbon Arc Cutting and Gouging Process) and the air pump to be withdrawn into the collection apparatus 22 (FIG. 2). Water and air introduced into nozzle assembly 24 cools any particulate matter that is at elevated temperature by quenching and breaking up molten globs into small particles and cooling or quenching the small particles and thus prevents the particulate matter from sticking to the nozzle assembly. The nozzle assembly 24 also prevents molten globs from merging into larger globs thus preventing the particles from sticking to each other as well as to the nozzle or conduit walls. Because of the air pump 29 the collected fume, environment surrounding the process apparatus, particulate matter, and cooling fluid are withdrawn into the filtering system 30. In the filtering system 30 the water falls to the bottom and is collected in the reservoir for draining and safe disposal. The water can be subject to further cleaning if necessary. The solid particulate matter settles to the bottom of the filter system 30 and is periodically cleaned from the system. The process gas (e.g. air) is directed toward the vacuum pump 36 and upon passing through the filter is cleaned of airborne particulate matter. The cleaned process gas is then removed from filtering system 30 through the filter 34 (arrow 38) and either placed in the environment or returned to the process apparatus for reuse.

FIG. 2 is an enlarged view of the collection apparatus 16. As part of the collection apparatus 16 the process apparatus e.g automatic air-carbon arc cutting and gouging torch 12' is placed in the hood 20 so that the electrode 14 is positioned at the right angle to the workpiece 10. Air-carbon arc cutting and gouging torch 12' includes the necessary apparatus to automatically feed the electrode to the workpiece as it is consumed. The hood 20 includes a pair of resilient wheels 50,52 mounted on either side through suitable spring loaded slide mechanisms 54,56 so that the hood 20 can move along the surface of the workpiece 10. Flexible curtain 21 is provided so that process fume does not escape to the surrounding atmosphere.

Figure 5:
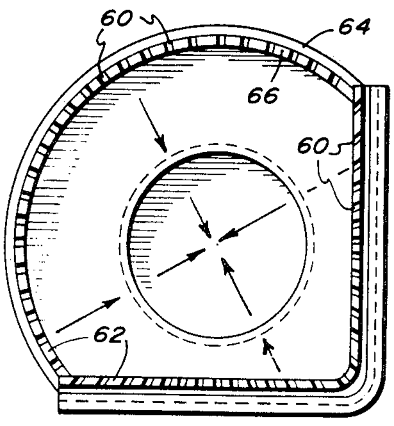
FIG. 5 is a front elevational view of the nozzle of FIG. 4.

FIGS. 4 and 5 show the nozzle assembly 24 which includes a jacketed assembly containing a plurality of holes or apertures 60 around the periphery of the inner wall 62 so that a cooling fluid (e.g. water and air) in conduit 28 will flow through the water jacket defined by the inner and outer shell 64,66 to the aperture 60 and be directed to the inside of the nozzle assembly 24. Apertures 60 are so constructed and arranged so that high pressure air and water jets converge at the center of the collector nozzle along its longitudinal axis to direct (propel) the collected environment, fume and particulate matter to the filtering system 30 as shown by the arrows of FIGS. 3 and 4. The high pressure air and water break up molten slag and particulate matter into small pieces while quenching the slag. The action of the high pressure air and water prevent large globs of molten slag from forming and solidifying to prevent clogging of the nozzle assembly. The water and air stream keeps all the collected material in suspension for movement to the filtering system 30 without compaction or segregation in system conduits or sticking on the walls of the system. The air and water continuously wets the inner surface molten metal from sticking to its inner surface. Thus, a water bath is created inside the nozzle assembly 24 so that hot gases and particulate matter forced into the nozzle assembly 24 where the particulate matter is broken up and held in suspension and the suspension is cooled, will not stick to the inner wall 62 of the nozzle assembly and can be readily conducted into the filter system 30 (FIG. 1).

In the event that it is desireable to minimize the operating noise associated with the Air-Carbon Arc Cutting and Gouging Process or any other process for which the apparatus and the invention is used, the collection assembly 16 can be surrounded with a cover lined with a sound absorbing material which contains a viewing port so that the process apparatus can be observed during operation. Such a cover can be readily constructed and need not seal against the workpiece in order to achieve a significant reduction in the operating noise level of the process apparatus.

It has been found that the angle of the process device can be between 20° and 90° to the point of contact with the workpiece in order to achieve effective collection of the fume and particulate matter generated by the process.

When using the slag and/or fume apparatus according to the present invention with the air-carbon arc cutting and gouging process the apparatus can be adapted for use in stationary position while the workpiece is moved by suitable means in a straight line, circular motion or a curvilinear motion. The collection apparatus can be constructed for movement while the workpiece remains stationary by affixing the apparatus to a carriage or to a like structure carrying the air-carbon arc cutting and gouging torch. The apparatus is adaptable for all positions of gouging and/or cutting such as in the flat or down hand position, in the vertical up or vertical down position, in the horizontal position, and in the over hand position. Lastly, the apparatus can be used in combinations with motion and position which require automatic control of the collectors, gouging electrode and gouging air jets.

The apparatus of the invention described herein achieves the following results in a manner heretofore unknown in the art:

1. Collects air borne fumes and large quantities of small particles and large globules of molten metallic material and/or slag generated by the Air-Carbon Arc Cutting and Gouging Process.
2. Breaks up large globules of molten metal and/or slag into small particles by water and air jets and keeps them suspended and moving in a conduit while being cooled to room temperature.
3. Keeps the molten slag from contacting and fusing to the walls of the nozzle and conduit by coating the walls with water and air.
4. Keeps the molten slag particles from agglomerating with other particles by force of the jets and cooling so no large unmoveable masses are formed.
5. Propels and conveys collected slag and fumes to a collection or separating station by force of the Air-Carbon Arc Cutting and Gouging Process air stream and a suction pump at the separator.

Having thus described our invention what is desired to be secured by letters patent of the United States is set forth in the appended claims. What is claimed:

1. A system for collecting fume and/or waste particulate matter generated by process apparatus used to perform cutting, gouging, surface treatment or joining a workpiece which processes generate large volumes of molten metal, slag and/or fume comprising in combination:

a mounting arm adapted for positioning adjacent to a workpiece upon which the process apparatus is to perform an operation;

a hood on said mounting arm adapted to receive the process apparatus and position said process apparatus in relation to said workpiece for facilitating operation of said process apparatus;

a nozzle assembly mounted on and positioned by said hood relative to said workpiece, said nozzle assembly comprising in combination; a hollow, generally elongated outer housing having a first end adapted for positioning toward said stream of fume and/or slag and a second end adapted for connection to a device for evacutating said nozzle; a plurality of fluid directing means disposed around the inner periphery of said nozzle to direct a plurality of streams of fluid toward said second end said streams converging at a point along the longitudinal axis defined by the center line of said second end of said nozzle; and means to direct a fluid to said fluid directing means so that a mixture of air and a cooling fluid can be introduced into said nozzle to produce jets converging along a center line of said nozzle and to cover the inside of said nozzle during operation of said process, said process apparatus and said nozzle assembly juxtapositioned so that fume and/or slag generated by said process apparatus is directly toward said nozzle assembly wherein said air and cooling fluid mixture in said nozzle assembly break up molten metal and/or slag into small pieces while quenching the metal and/or slag and keep collected material in suspension without compaction or segregation, said process apparatus and said nozzle assembly fixed at an angular relationship to each other so that said process apparatus directs generated fume and/or slag into such nozzle; and a pump to evacuate generated fume, metal particles slag particles and/or environment containing particulate matter and cooling fluid collected in said nozzle assembly from said nozzle assembly and direct said metal, to a separator for separating said fume, collect particulate matter and cooling fluid and return clean air to the surrounding environment.

2. A system according to claim 1 wherein said housing includes a fume seal adapted to engage said work piece in an area surrounding said process apparatus and said nozzle.

3. A system according to claim 1 wherein said process apparatus includes an air-carbon arc cutting and gouging torch.

4. A system according to claim 1 wherein said separator includes a filtering system containing means to collect said cooling fluid, means to filter said air and means to create a partial vacuum in said filtering system whereby said air is filtered and returned to the ambient atmosphere.

5. A system according to claim 2 wherein said housing includes a sound absorbing lining and access ports for viewing said process apparatus in operation.

6. A system for collecting fume and/or slag generated by operation of Air Carbon-Arc Cutting and Gouging Process apparatus comprising in combination:

a mounting arm assembly adapted for positioning adjacent to a workpiece upon which the air carbon-arc cutting and gouging apparatus is to perform an operation;

a hood on said mounting arm assembly to position said air carbon-arc cutting and gouging apparatus at an angle to said workpiece;

a nozzle assembly mounted on and positioned by said hood, said nozzle assembly comprising in combination, a hollow, generally elongated outer housing having a first end adapted for positioning toward said stream of fume and/or slag and a second end adapted for connection to a device for evacutating said nozzle; a plurality of fluid directing means disposed around the inner periphery of said nozzle to direct a plurality of streams of fluid toward said second end said streams converging at a point along the longitudinal axis defined by the center line of said second end of said nozzle; and means to direct a fluid to said fluid directing means and so relating to said process apparatus so that when said process apparatus is in operation fume, molten metal and/or molten slag generated by said cutting and gouging apparatus is directed toward said nozzle for collection inside thereof, said nozzle including means to introduce a cooling fluid mixed with air in the form of jets converging along the center line of said nozzle said jets of cooling fluid-air mixture serving to keep said generated fume and/or slag in suspension, break up large solid pieces of molten metal and/or molten slag, cool said particles and prevent particles adhering to the walls of said nozzle assembly said process apparatus and said nozzle fixed at an angular relationship to each other so that said process apparatus directs generated fume, metal and/or slag into said nozzle; and a pump to evacuate process environment containing fume, metal and/or slag suspended in said nozzle and cooling fluid from said nozzle and direct said suspension and cooling fluid to means to separate said fume, collect slag and cooling fluid and return clean air to the ambient environment.

7. A system according to claim 6 wherein said housing surrounding said process apparatus and said nozzle includes a fume seal adapted to engage said workpiece in an area surrounding said process apparatus and said nozzle.

8. A system according to claim 7 wherein said housing, includes a sound absorbing lining and access ports for viewing said process apparatus in operation.

9. A system according to claim 7 wherein said means to separate including a filtering system containing means to collect said cooling fluid, means to filter said air and means to create a partial vacuum in said filtering system whereby said air is filtered and returned to the ambient atmosphere.

* * * * *